United States Patent
Lee et al.

(10) Patent No.: US 7,301,957 B2
(45) Date of Patent: Nov. 27, 2007

(54) MULTI-HOME AGENT CONTROL APPARATUS AND METHOD

(75) Inventors: Hak-goo Lee, Suwon-si (KR); Young-keun Kim, Incheon Maetropolitan (KR); Sun-woo Kim, Suwon-si (KR); Sang-hyun Shin, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 602 days.

(21) Appl. No.: 10/804,215

(22) Filed: Mar. 19, 2004

(65) Prior Publication Data
US 2005/0018632 A1    Jan. 27, 2005

(30) Foreign Application Priority Data
Mar. 21, 2003    (KR)    ............ 10-2003-0017747

(51) Int. Cl.
*H04J 3/26*    (2006.01)
(52) U.S. Cl. ............... 370/432; 370/329; 370/395.31; 455/450
(58) Field of Classification Search ......... 370/395.31, 370/395.52, 432, 329, 278; 455/450
See application file for complete search history.

(56) References Cited

U.S. PATENT DOCUMENTS

| | | | |
|---|---|---|---|
| 6,973,057 B1 * | 12/2005 | Forslow | ............ 370/328 |
| 2001/0046223 A1 | 11/2001 | Malki et al. | |
| 2002/0120766 A1 | 8/2002 | Okajima et al. | |

FOREIGN PATENT DOCUMENTS

| | | |
|---|---|---|
| JP | 2002-185520 A | 6/2002 |
| JP | 2002-261806 A | 9/2002 |
| JP | 2002-271368 A | 9/2002 |

* cited by examiner

*Primary Examiner*—Temica Beamer
(74) *Attorney, Agent, or Firm*—Sughrue Mion, PLLC (57) ABSTRACT

A multi-home agent control apparatus and method are provided. The multi-home agent control apparatus includes a packet observing unit, which observes a packet input to or output from a home link; a home agent list storage unit, which creates a home agent list using home address information included in a binding update (BU) message and stores the home agent list if the packet observing unit receives the BU message and a binding acknowledgement (BACK) message; and a preference value calculation unit, which calculates a preference value of each of the home agents using the home agent list.

24 Claims, 9 Drawing Sheets

| HOME AGENT ADDRESS | HOME ADDRESS | CoA ADDRESS | LIFE TIME |
|---|---|---|---|
| 3ffe:2e01:2a:4::1/64 | 3ffe:2e01:2a:4:1:2:3:4/64 | 3ffe:2e01:2a:4:1:2:3:5/64 | 0x10 |
| 3ffe:2e01:2a:4::1/64 | 3ffe:2e01:2a:4:5:6:7:8/64 | 3ffe:2e01:2a:4:5:6:7:9/64 | 0x20 |
| 3ffe:2e01:2a:5::1/64 | 3ffe:2e01:2a:5:9:0:1:2/64 | 3ffe:2e01:2a:5:9:0:1:3/64 | 0x30 |
| 3ffe:2e01:2a:5::1/64 | 3ffe:2e01:2a:5:3:4:5:6/64 | 3ffe:2e01:2a:5:3:4:5:7/64 | 0xffff |
| ... | ... | ... | ... |

| TYPE (1101) | CODE (1102) | CHECKSUM (1103) |
|---|---|---|
| IDENTIFIER (1104) || RESERVED (1105) |

| TYPE (1111) | CODE (1112) | CHECKSUM (1113) |
|---|---|---|
| IDENTIFIER (1114) || RESERVED (1115) |
| HOME AGENT ADDRESS (1116) |||

1110

MULTI-HOME AGENT CONTROL APPARATUS AND METHOD

BACKGROUND OF THE INVENTION

This application claims the priority of Korean Patent Application No. 2003-17747, filed on Mar. 21, 2003, in the Korean Intellectual Property Office, the disclosure of which is incorporated herein in its entirety by reference.

1. Field of the Invention

The present invention relates to mobile Internet Protocol version 6 (IPv6), and more particularly, to an apparatus and method for distributing a load between home agents in a mobile IPv6 environment.

2. Description of the Related Art

In recent years, the exponential growth of the number of people who access the Internet using their mobile terminals has resulted in shortages of IP addresses. Therefore, a large amount of research has been carried out on mobile IPv6 applications.

Figure 1:
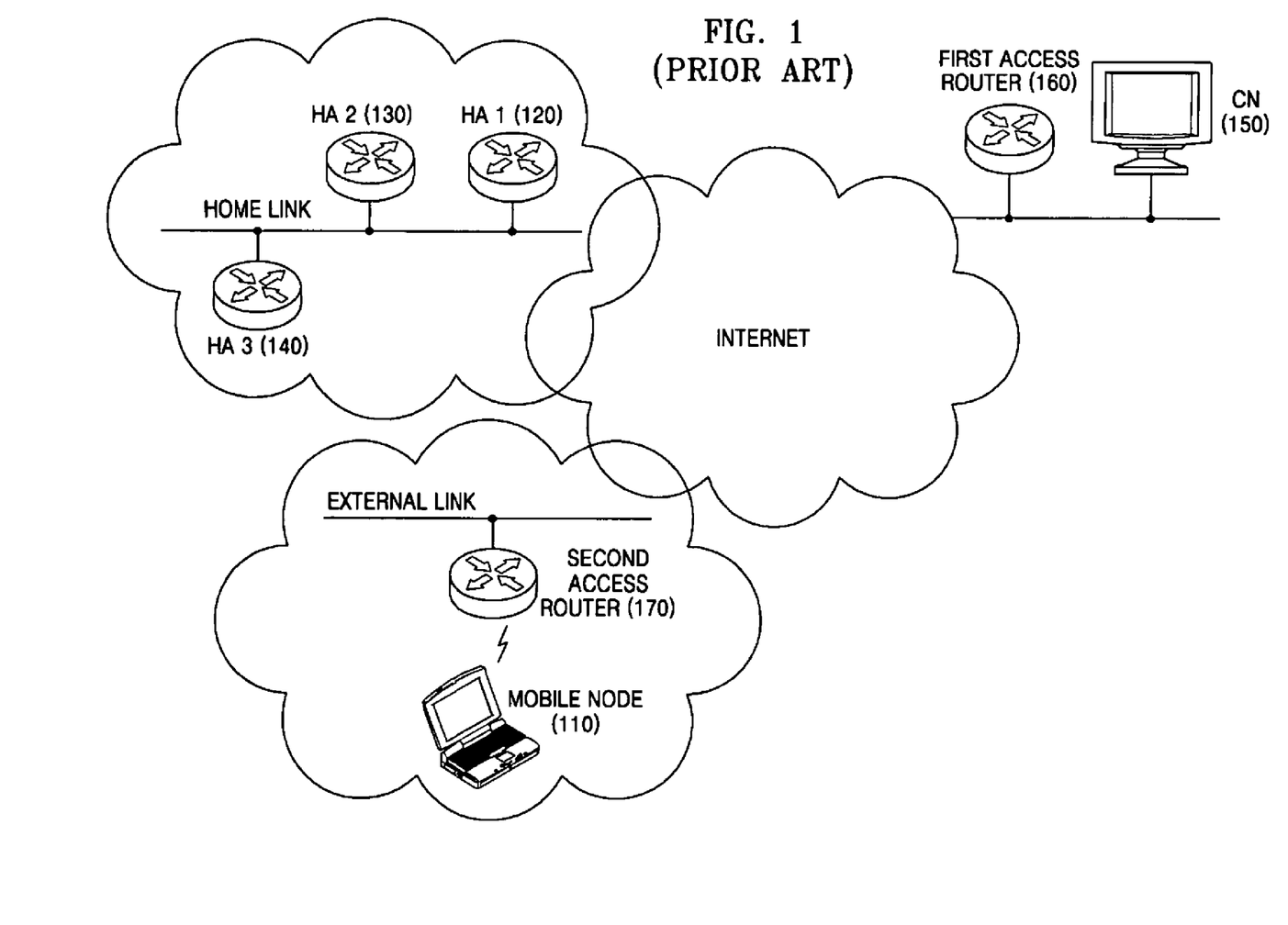
FIG. 1 is a diagram illustrating a related art mobile IPv6 system.

FIG. 1 illustrates a mobile IPv6 system in the related art. Referring to FIG. 1, the mobile IPv6 system includes a mobile node (MN) 110, home agents (HA) 120, 130, and 140, which are routers that manage a home address of the mobile node 110 and create a router advertisement (RA) message used for creating a care-of-address (CoA), and a correspondent node (CN) 150, which communicates with the mobile node 110. In addition, the mobile IPv6 system further includes first and second access routers 160 and 170, respectively which route packets from a device attached to an external link. Only one home agent may exist on a home link, or, for example, as shown in FIG. 1, a plurality of home agents, i.e., the home agents 120, 130, and 140, may exist on the home link. The plurality of home agents existing on the home link are called multi-home agents.

In the mobile IPv6 system of FIG. 1, a location of the mobile node 110 can always be detected by referring to the home address of the mobile node 110, regardless of whether the mobile node 110 is connected to the home link or an external link distant from the home link. The home address of the mobile node 110 is an IP address exclusively allocated to the mobile node 110 in a home subnet prefix on the home link.

When the mobile node 110 belongs to the home link, packets with the home address of the mobile node 110 as a destination address are routed by any of the home agents in the home link using a conventional Internet routing mechanism. However, if the mobile node 110 is connected to the external link, distant from the home link, the access router 170 of the external link allocates a preliminary address, i.e., a CoA, to the mobile node 110 because the access router 170 cannot determine the home address of the mobile node 110. Thereafter, the access router 170 routes packets destined for the mobile node 110 using the CoA. The CoA is an IP address related to the mobile node 110 when it has a subnet prefix of the external link.

The mobile node 110 can obtain a CoA using a conventional IPv6 auto-configuration method. When the mobile node 110 is attached to the external link, packets destined for the CoA allocated to the mobile node 110 are routed to the mobile node 110. That is, the preliminary address allocated to the mobile node 110, while the mobile node 110 belongs to the external link rather than the home link, is the CoA.

A process of associating the home address of the mobile node 110 with the CoA is called 'binding'. When the mobile node 110 is not connected to the home link, the mobile node 110 registers its CoA with a router on the home link to which it belongs. Then, the router serves as a home agent for the mobile node 110. The mobile node 110 carries out binding by sending a binding update (BU) message to the corresponding home agent. Then, the home agent responds to the reception of the BU message by returning a binding acknowledgement (BACK) message to the mobile node 110. The BU message and the BACK message are transmitted to the home agent and the mobile node 110 using an extension header of an IPv6 packet.

A protocol, home agent address discovery, has been recently suggested with respect to mobile IPv6 standards. In particular, the home agent address discovery protocol may support reconfiguration of a plurality of home agents on a home network. A mobile node may not be able to know what its home agent's IP address is, or the mobile node's home subnet prefix may change over the passage of time. A dynamic home agent address discovery mechanism enables a mobile node to obtain an IP address of a home agent on a home link from which the mobile node is based, even when the mobile node is away from the home link.

In other words, a home agent is able to track other home agents on a link where the home agent belongs, and maintains home agent list record information regarding the other home agents. The home agent list is used in the dynamic home agent address discovery mechanism.

A mobile node carries out dynamic home agent address discovery by sending a home agent address discovery request message to a mobile IPv6 home agent. Then, the mobile IPv6 home agent returns a home agent address discovery response message to the mobile node.

When the mobile node accesses a home link for the first time, the mobile node is given a home address that does not change from a home agent (i.e., a master home agent). If the mobile node accesses an external link after leaving the home link, it is given a new preliminary address, i.e., a CoA. When the mobile node receives the CoA, the mobile node sends a BU message to the master home agent, and the master home agent responds to the reception of the BU message by sending a BACK message to the mobile node. Thereafter, the mobile node periodically sends a BU message to, and receives a BACK message from, the master home agent.

The master home agent may not operate due to resetting, repairing of a system or a breakdown of the system, in which case, the mobile node may not receive a BACK message from the master home agent. In this case, the mobile node carries out a home agent address discovery protocol to obtain a new home address.

In order to obtain a new home address, the mobile node anycasts a home agent address discovery request message to a home agent prefix of a home link to which the master home agent belongs.

Then, a home agent that receives the home agent address discovery request message transmits a home agent list, on which unicast addresses of all neighboring home agents are listed, to the mobile node.

The mobile node selects a new home agent address from the unicast addresses included in the received home agent list by taking a priority setting of the listed unicast addresses into consideration. In general, a home agent address with a high priority is selected. Thereafter, the mobile node periodically sends a BU message to, and receives a BACK message from, a new home agent with the selected home agent address.

Figure 2:
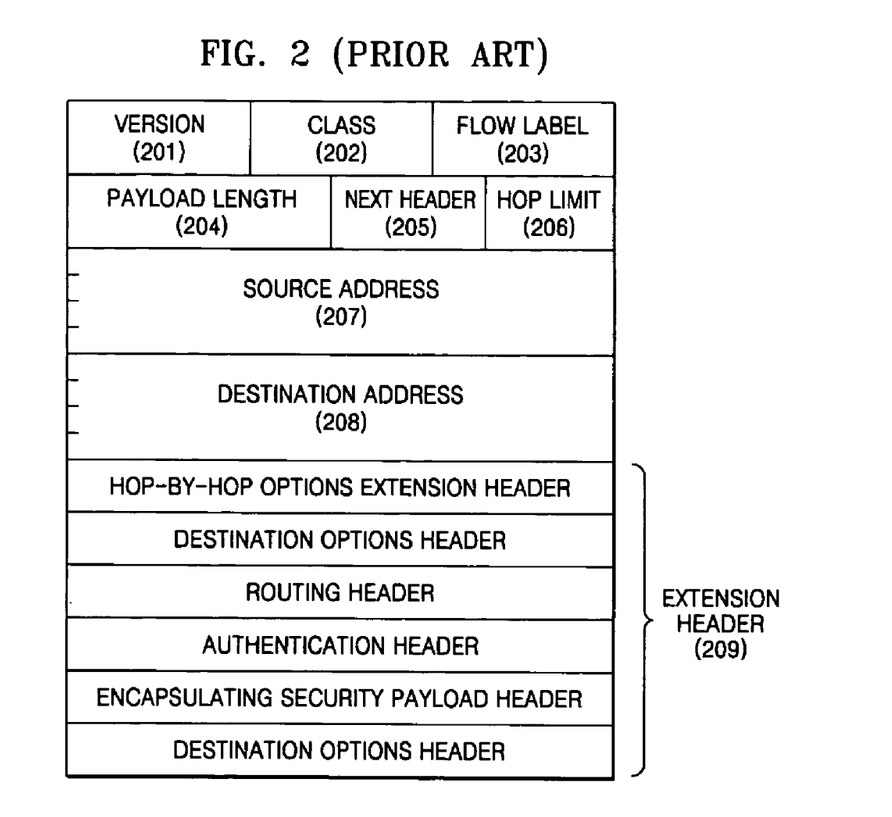
FIG. 2 is a diagram illustrating the format of an IPv6 basic header.

FIG. 2 illustrates the format of an IPv6 basic header. Referring to FIG. 2, the IPv6 basic header includes a version field 201, a class field 202, a flow label field 203, a payload length field 204, a next header field 205, a hop limit field 206, a source address field 207, a destination address field 208, and an extension header 209.

Figure 3:
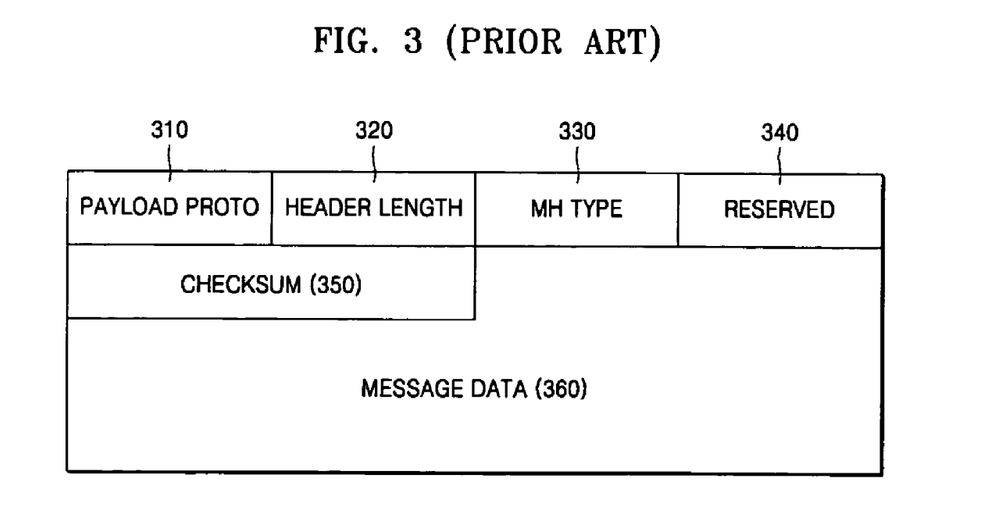
FIG. 3 is a diagram illustrating the format of a mobility header.

FIG. 3 illustrates the format of a mobility header. Referring to FIG. 3, the mobility header includes a payload proto field 310, a header length field 320, a mobility header type field 330, a reserved field 340, a checksum field 350, and a message data field 360.

The mobility header is an extension header used for any type of message related to binding creation and management. The mobility header may come right after the IPv6 basic header of FIG. 2 if information that mobile IPv6 data will be transmitted along with a next header is stored in the next header field 205 of the IPv6 basic header.

When the payload proto field 310 has the same value as the next header field 205, the mobility header follows the IPv6 basic header. The header length field 320 indicates the length of the mobility header. The mobility header type field 330 indicates the type of the mobility header. For example, if the mobility header type field 330 has a value of 0, then a binding refresh message is contained in the message data field 360. On the other hand, if the mobility header type field 330 has a value of 5, then a BU message is contained in the message data field 360. Data with a format illustrated in FIG. 5 may be contained in the message data field 360.

Figure 4:
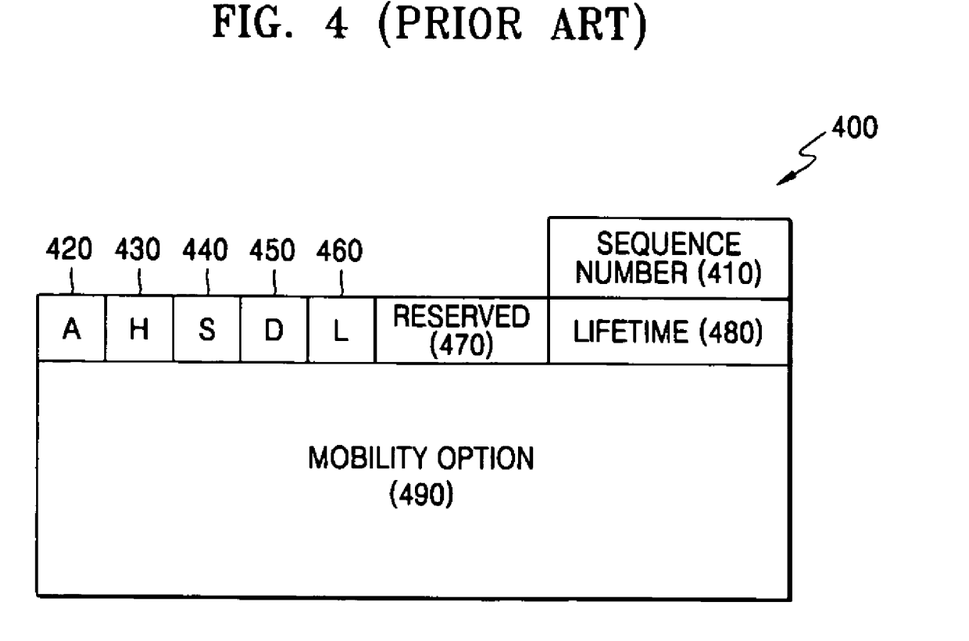
FIG. 4 is a diagram illustrating the format of a binding update (BU) message.

FIG. 4 illustrates a BU message. The BU message is used by a mobile node to inform a home agent of the new CoA of the mobile node.

Referring to FIG. 4, a BU message 400 includes a sequence number field 410, an acknowledgement field 420, a home registration field 430, a single address only field 440, a duplicate address detection field 450, a link local address compatibility field 460, a reserved field 470, a lifetime field 480, and a mobility option field 490. The lifetime field 480 indicates the number of time units left before binding is complete.

Figure 5:
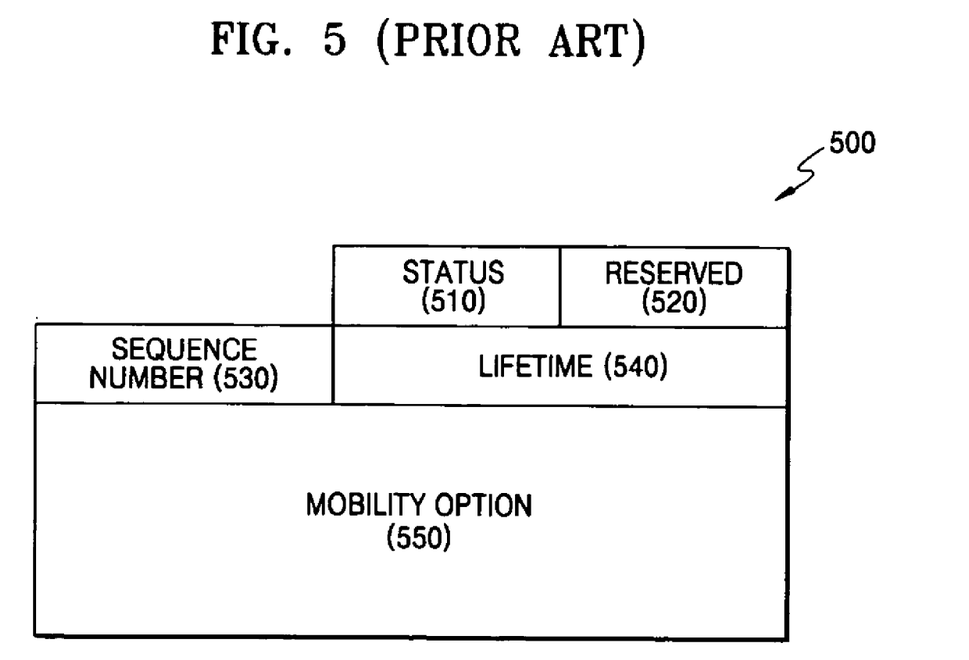
FIG. 5 is a diagram illustrating the format of a binding acknowledgement (BACK) message.

FIG. 5 illustrates a BACK message. Referring to FIG. 5, a BACK message 500 is used by a home agent to confirm that a BU message has been successfully received.

The BACK message 500 includes a status field 510, a reserved field 520, a sequence number field 530, a lifetime field 540, and a mobility option field 550.

The status field 510, which is represented by a eight-bit integer without a sign, indicates the characteristics of binding update. If the status field 510 has a value smaller than 128, it means the BU message 400 has been accepted by a receiving node. If the status field 510 has a value not smaller than 128, it means that the BU message 400 has been rejected by the receiving mode. For example, if the status field 510 has a value of 0, it means that the BU message 400 has been accepted by the receiving node. The sequence number field 530 of the BACK message 500, which is copied from the sequence number field 410 of the BU message 400, matches the BU message 400 with the BACK message 500.

When selecting a home agent with which a mobile node is registered from a plurality of home agents, the mobile node refers to a New Home Agent Information Option, which is one option for router advertisement messages, recommended in the mobile IPv6 draft. The format of the New Home Agent Information Option is illustrated in FIG. 6.

Figure 6:
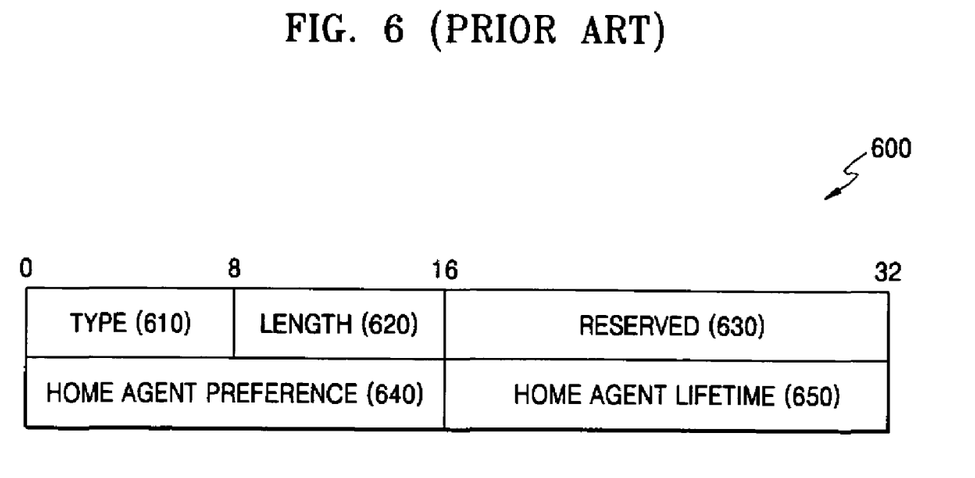
FIG. 6 is a diagram illustrating the format of a home agent information option.

Referring to FIG. 6, a home agent information option 600 includes an 8-bit type field 610, an 8-bit length field 620, a reserved field 630, a home agent preference field 640, and a home agent lifetime field 650.

A preference value represented by a 16-bit integer is stored in the home agent preference field 640. The higher the preference of the home agent information option 600 is, the higher the value stored in the home agent preference field 640. In other words, a home agent with a home agent preference field that contains a larger value is more likely to be selected by a mobile node. The value of the home agent preference field 640 of a home agent that does not adopt the home agent information option 600 is set to 0. There are two methods of determining the preference value of each home agent, i.e., a static setting method, in which a network manager arbitrarily sets the preference value of each home agent, and a dynamic setting method, in which the preference value of each home agent is determined according to the status of each home agent. More specifically, in the static setting method, the network manager determines the status of each home agent and determines the preference value of each home agent. On the other hand, in the dynamic setting method, the preference value of each home agent is continuously updated to reflect the status of each home agent. The home agent lifetime field 650 contains information, such as a router's lifetime.

However, the static setting method may be too inefficient to appropriately distribute loads because a user arbitrarily inputs a preference value for each of the home agents without considering a current status of each of the home agents. Therefore, it is necessary to adjust priority among home agents based on the status of each home agent.

SUMMARY OF THE INVENTION

It is an object of the present invention to provide a multi-home agent control apparatus and method in a mobile IPv6 environment, which can dynamically set a preference value for each home agent by considering the status of each home agent.

According to an aspect of the present invention, there is provided a multi-home agent control apparatus, which manages a plurality of home agents. The multi-home agent control apparatus includes a packet observing unit, which observes a packet input to or output from a home link; a home agent list storage unit, which creates a home agent list using home address information included in a binding update (BU) message and stores the home agent list if the packet observing unit receives the BU message and a binding acknowledgement (BACK) message; and a preference value calculation unit, which calculates a preference value of each of the home agents using the home agent list.

According to another aspect of the present invention, there is provided a multi-home agent control method, which is used to manage a plurality of home agents. The multi-home agent control method involves (a) observing a packet input to or output from a home link; (b) creating a home agent list using home address information included in a binding update (BU) message and storing the home agent list if the BU message and a binding acknowledgement (BACK) message are received in step (a); and (c) calculating a preference value of each of the home agents using the home agent list.

According to another aspect of the present invention, there is provided a multi-home agent control method, which is used to manage a plurality of home agents. The multi-home agent control method involves (a) reading a packet transmitted to a home link from an external link; (b) storing home address information, which includes a home address recorded in a home address option field of the packet read in step (a), a destination address of an IPv6 header of the packet, a care-of-address (CoA) and lifetime information, in temporary memory if the packet is a BU message; (d)

reading a packet transmitted to an external link from the home link and determining whether the packet is a binding acknowledgement (BACK) message; (e) creating a home agent list if the packet read in step (d) is a BACK message; (f) calculating a preference value of each of the home agents using the home agent list; and (g) updating the home agent list at a predetermined frequency.

According to another aspect of the present invention, there is provided a computer-readable recording medium on which a program that enables the above-mentioned multi-home agent control method is recorded.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings in which exemplary embodiments of the invention are shown.

Figure 7A:
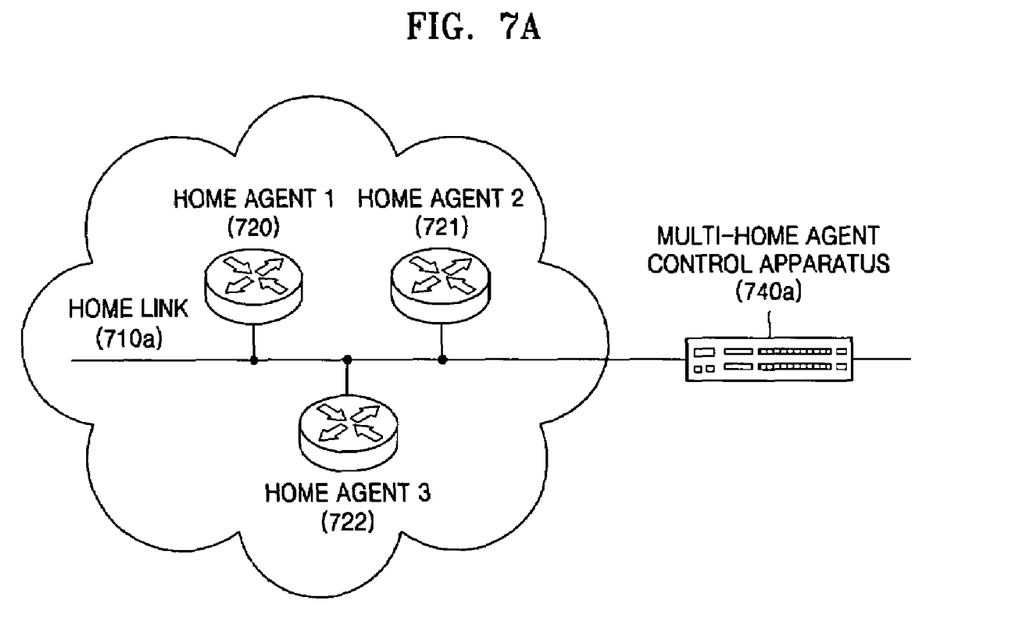
FIGS. 7A and 7B are diagrams illustrating home links of IPv6 networks having multi-home agents.
Figure 7B:
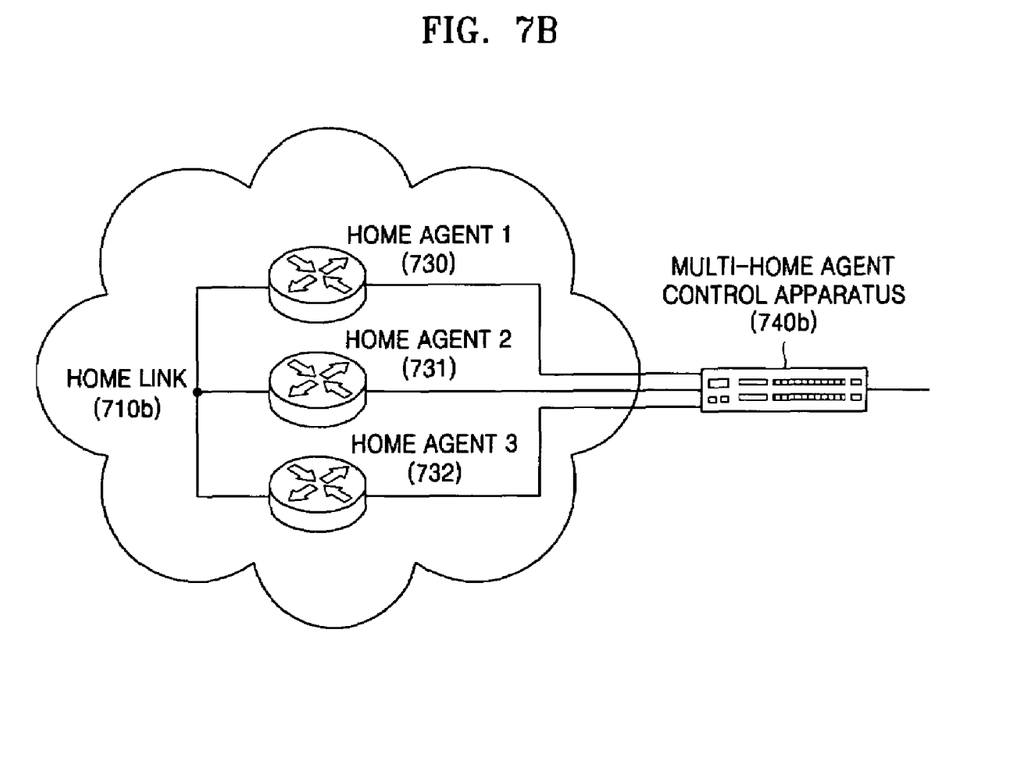

FIGS. 7A and 7B are diagrams illustrating home links of IPv6 networks having multi-home agents. Referring to FIGS. 7A and 7B, a mobile Ipv6 network of the present invention includes a home link 710a, a plurality of home agents 720 through 722, a home link 710b and a plurality of home agents 730 through 732. A mobile node selects a home agent from among the plurality of home agents 720 through 722 or 730 through 732 and registers a home address of the mobile node with the selected home agent, a process which is called binding update (BU). Each of the home agents 720 through 722 or 730 through 732 has a home agent list. On the home agent list, address information and preference information for each of the home agents are stored. A multi-home agent control apparatus 740a or 740b, which evenly distributes a load among the plurality of home agents 720 through 722 or 730 through 732, observes inbound packets, input to the home link 710a or 710b, and outbound packets, transmitted to an external link from the home link 710a or 710b, and manages the home agent list.

Figure 8:
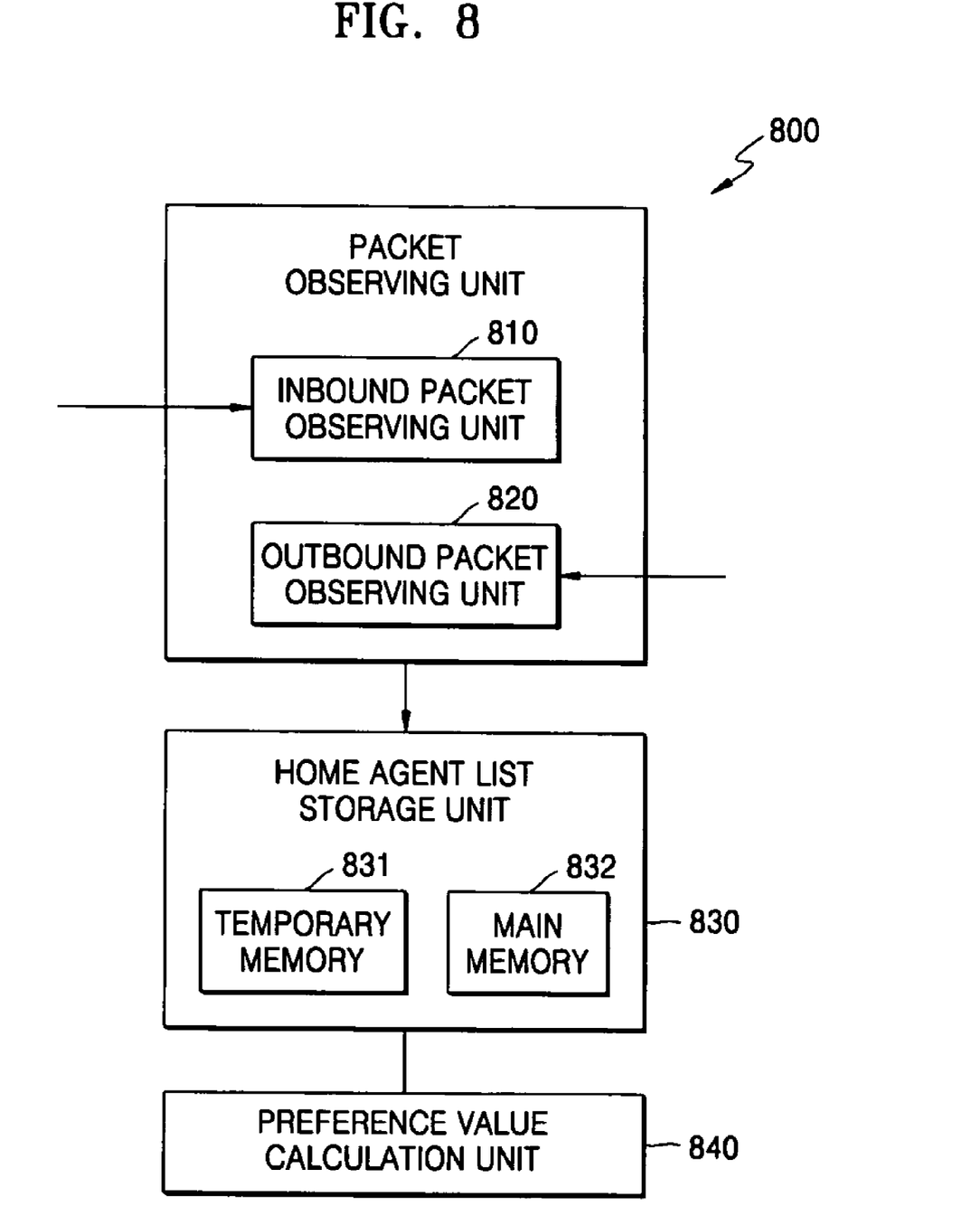
FIG. 8 is a block diagram of a multi-home agent control apparatus according to a first embodiment of the present invention.

FIG. 8 is a block diagram of a multi-home agent control apparatus according to a first embodiment of the present invention. Referring to FIG. 8, an apparatus 800 that controls multi-home agents, which evenly distributes a load among a plurality of home agents, includes an inbound packet observing unit 810, an outbound packet observing unit 820, a home agent list storage unit 830, and a preference value calculation unit 840.

Data transmitted between a home agent and a mobile node passes through the apparatus 800. The inbound packet observing unit 810 reads a packet transmitted from an external link to a home link, determines whether the read packet is a BU message, and transfers a home address of the packet information to a temporary memory 831. The home address information may include a home address recorded in a home address option field of the packet, an address of a predetermined home agent, which is a destination address of an IPv6 header of the packet, and a care-of-address (CoA) of the mobile node, and lifetime information.

The outbound packet observing unit 820 reads a packet transmitted to an external link from the home link and determines whether the packet is a binding acknowledgement (BACK) message. If the packet is a BACK message, the outbound packet observing unit 820 examines a status field (510) of the BACK message. If the status field has a value of 0, then the predetermined home agent allows the mobile node to perform BU. The outbound packet observing unit 820 creates a home agent list by copying the home address information stored in the temporary memory 831, i.e., the home address's the predetermined home agent, the mobile node's home address and CoA, and lifetime information, to a main memory 832.

The home agent list storage unit 830, which includes the temporary memory 831 and the main memory 832, stores the home agent list created by the outbound packet observing unit 820.

The preference value calculation unit 840 periodically counts the number of mobile nodes bound to each home agent by referring to the home agent list stored in the home agent list storage unit 830 and calculates a preference value for the predetermined home agent. The cycle of the counting of the number of mobile nodes bound to each home agent may be appropriately determined by a network manager.

A performance of the predetermined home agent should be determined before calculating the preference value of the predetermined home agent. If there is another home agent with the same performance as the predetermined home agent on a corresponding home link, both home agents have the same performance weight. However, if there are home agents with different performances than the predetermined home agent on the home link, the performance weight of the predetermined home agent, which is used to determine the preference value of the predetermined home agent, is different from the performance weights of the other home agents. The preference value of the predetermined home agent is determined by multiplying the performance weight of the predetermined home agent by the number of mobile nodes bound to the predetermined home agent. Since the preference value of the predetermined home agent is preferably an integer, the performance weight of the predetermined home agent is an integer. The performance weight of the predetermined home agent can be determined and input by the network manager.

The operation of the multi-home agent control apparatus of FIG. 8 will now be described in greater detail with reference to FIG. 9.

Figure 9:
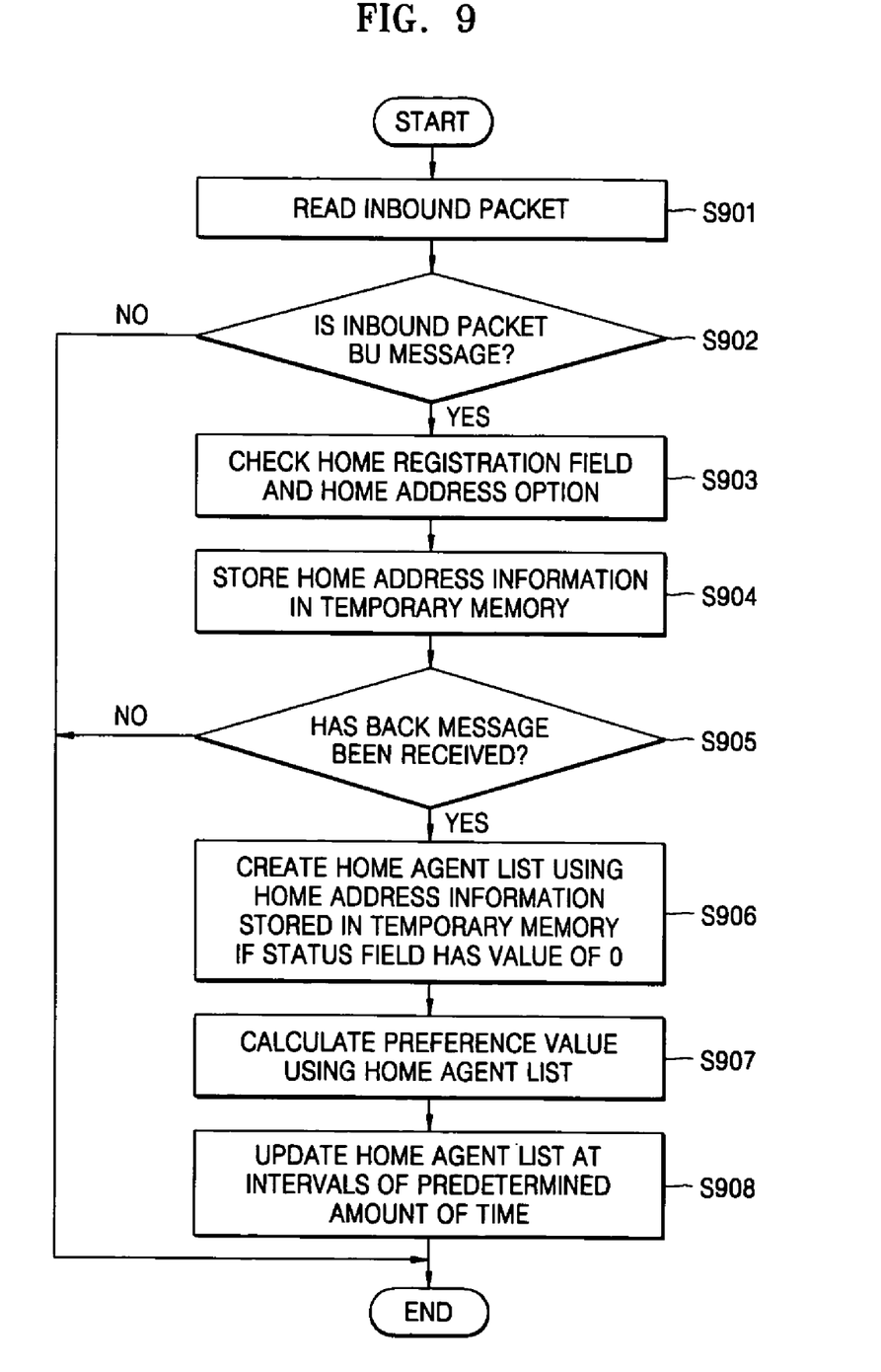
FIG. 9 is a flowchart of a method of controlling multi-home agents according to a second embodiment of the present invention.

FIG. 9 is a flowchart illustrating a method of controlling multi-home agents according to a second embodiment of the present invention. Referring to FIG. 9, the inbound packet observing unit 810 reads an inbound packet, which is transmitted to the home link from an external link, in step S901. In step S902, the inbound packet observing unit 810 determines whether the packet is a BU message by referring to a next header field of an IPv6 header of the packet. If the packet is a BU message, a mobility header recorded in the next header field indicates that the type of the packet is a BU message.

In step S903, if the packet is a BU message, the temporary memory 831 determines whether a home registration field 430 of the BU message is set to 1 and whether the packet contains a home address option. The home address option is always included in the BU message if a mobile node communicates with a predetermined home agent. If the home registration field of the BU message is set to 1 and contains the home address information, i.e., the mobile node's home address, recorded in a home address option field of the packet, the address of the predetermined home agent, which is a destination address of the IPv6 header of the packet, the CoA of the mobile node, and lifetime information are stored in the temporary memory 831 in step S904.

The temporary memory 831 is a queue-type memory that has a small storage capacity. Therefore, if the temporary memory 831 has not received a BACK message for more than a predetermined amount of time, the information stored in the temporary memory 831 is automatically deleted. Therefore, in step S905, it is determined whether a BACK message has been received by observing outbound packets. If a BACK message has been received from the predetermined home agent, which is one of the home agents managed by the apparatus 800, a status field 510 of the BACK message is determined. If the status field of the BACK message has a value of 0, then the predetermined home agent allows the mobile node to perform a BU. In step S906, a home agent list is created by copying the information stored in the temporary memory 831, i.e., the address of the predetermined home agent, the CoA of the mobile node, and the lifetime information, to the main memory 832.

Figure 10:
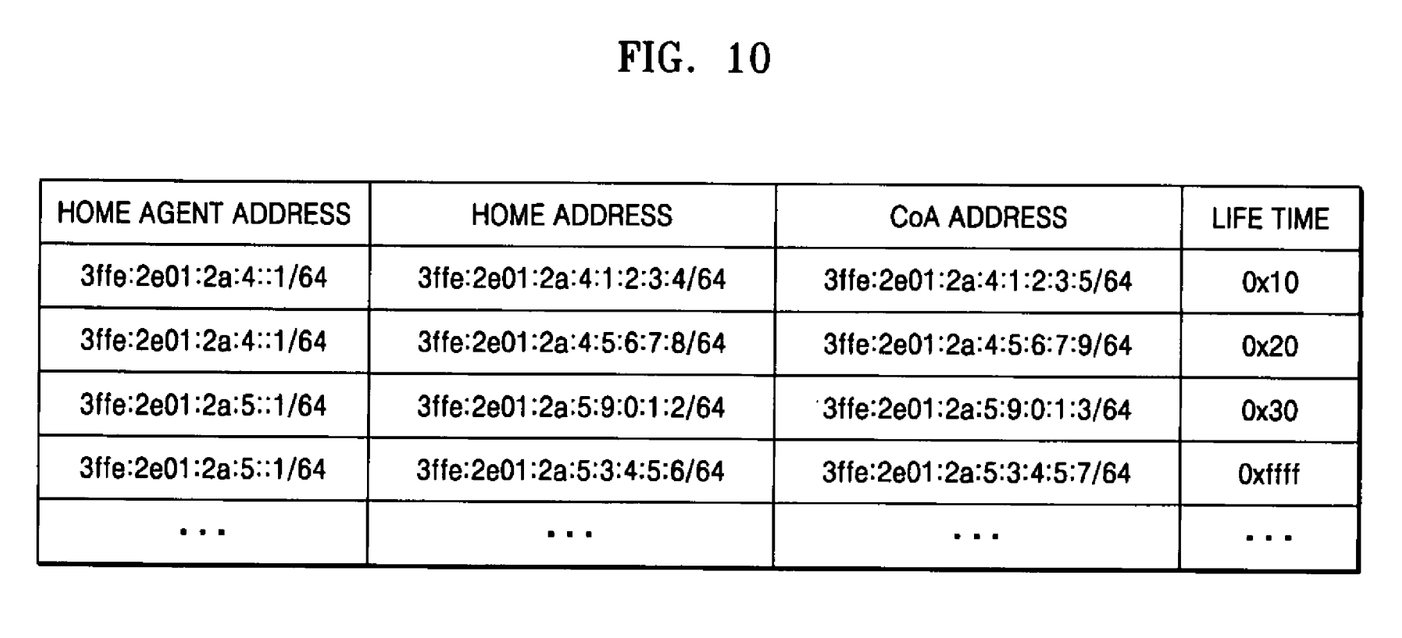
FIG. 10 is a diagram illustrating an example of a home agent list.

FIG. 10 is a diagram illustrating an example of the home agent list including the address of the predetermined home agent, the CoA of the mobile node, and the lifetime information stored in the main memory 832. The home agent list of the main memory 832 may further include some home address information stored in the temporary memory 831 that has been previously binding-updated and thus, has already been stored as an entry in the home agent list. Therefore, the information that has already been binding-updated and stored in the home agent list does not need to be added to the home agent list again. Rather, only new entries are added to the home agent list by searching the main memory 832. The address of the predetermined home agent is searched for, and then the home address of the mobile node is searched for. If the address of the predetermined home agent and the home address of the mobile node already exist in the home agent list, only the lifetime information is updated.

If the address of the predetermined home agent and the home address of the mobile node already do not exist in the home agent list, an entry regarding the address of the predetermined home agent and the home address of the mobile node is added to the home agent list. The entries on the home agent list with a lifetime that is over are removed, and then the rest are resorted.

Thereafter, in step S907, a preference value of the predetermined home agent is determined by counting the number of mobile nodes bound to the predetermined home agent. The number of mobile nodes bound to the predetermined home agent is periodically calculated, and the frequency of the calculation is appropriately determined by a network manager.

A performance of the predetermined home agent is determined before calculating the preference value of the predetermined home agent. If there is another home agent with the same performance as the predetermined home agent on a corresponding home link, then both home agents have the same performance weight. However, if there are home agents with different performances than the predetermined home agent on the home link, the performance weight of the predetermined home agent, which is used to determine the preference value of the predetermined home agent, is different from the performance weights of the other home agents. The preference value of the predetermined home agent is determined by multiplying the performance weight of the predetermined home agent by the number of mobile nodes bound to the predetermined home agent. Since the preference value of the predetermined home agent is preferably an integer, the performance weight of the predetermined home agent is an integer. The performance weight value of the predetermined home agent can be determined and input by the network manager.

In step S908, the home agent list is periodically updated by removing entries with lifetimes that are over from the home agent list.

Figure 11A:
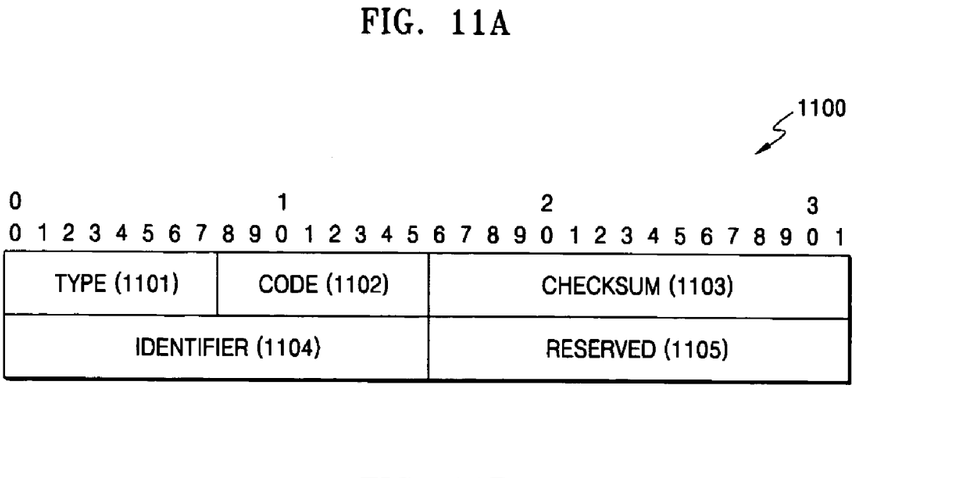
FIG. 11A is a diagram illustrating an Internet control message protocol (ICMP) home address discovery request message.
Figure 11B:
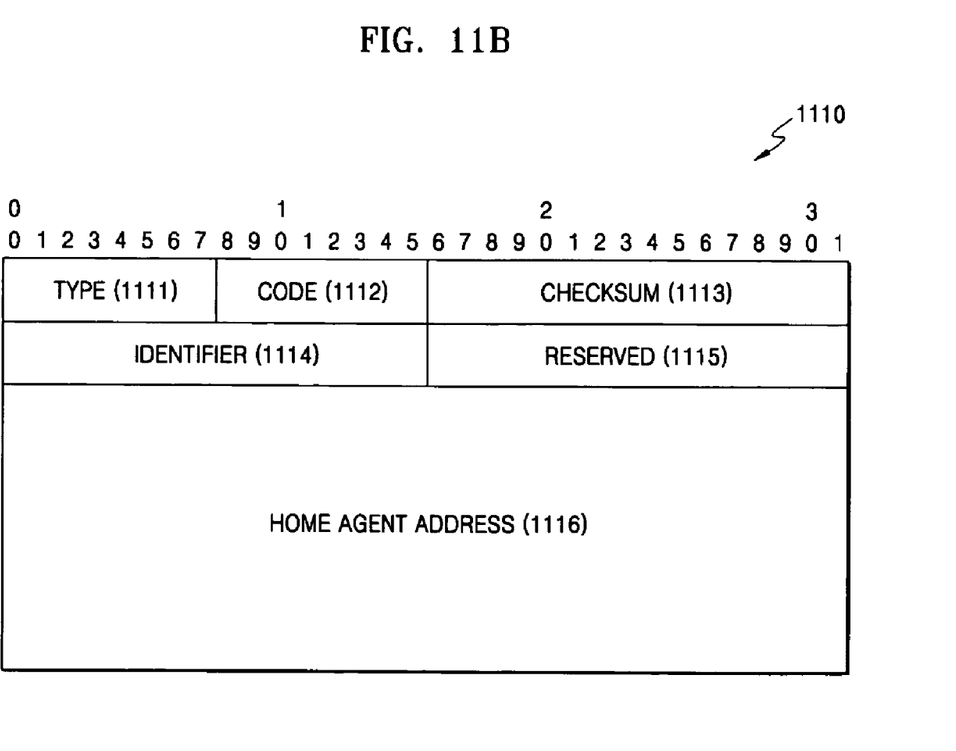
FIG. 11B is a diagram illustrating a home address discovery response message.

FIGS. 11A and 11B are diagrams illustrating an internet control message protocol (ICMP) home address discovery request message and a home address discovery acknowledgement message, respectively.

Referring to FIG. 11A, a home agent address discovery request message 1100 includes a type field 1101, a code field 1102, a checksum field 1103, a home agent address request identifier field 1104, and a reserved field 1105. The home agent address discovery request identifier field 1104, which is provided for matching the home agent address discovery request message 1100 with a corresponding response message, indicates that the home agent address discovery request message 1100 is a message that requests a discovery of an address of a predetermined home agent.

A home agent address discovery acknowledgement message 1110 is used by a home agent to respond to a mobile node that uses a dynamic home agent address discovery mechanism. Referring to FIG. 11B, the home agent address discovery acknowledgement message 1110 includes a type field 1111, a code field 1112, a checksum field 1113, an identifier field 1114, which is invoked by a home agent address request message, a reserved field 1115, and a home agent address field 1116. The home agent address field 1116 includes a list of addresses of home agents on a predetermined home link.

A preference value of each home agent, which is periodically recalculated, is included in a proxy ICMP home agent address discovery message, and then the proxy ICMP home agent address discovery message is transmitted to a home agent. Then, the home agent stores the preference value of each of the home agents with the home address of each of the home agents in a descending order. Thereafter, if a virtual ICMP home agent address discovery message arrives at a home link to which the master home agent belongs, the master home agent responds to the virtual ICMP home agent address discovery message by determining priority among the addresses of home agents that it manages according to their preference values. Then, a mobile node selects a home agent with the smallest load from the home agents.

The present invention can be realized as computer-readable codes or instructions stored on a computer-readable recording medium. The computer-readable recording medium may include any kind of recording device on which data can be written in a computer-readable manner. For example, the computer-readable recording medium includes ROM, RAM, CD-ROM, a magnetic tape, a hard disk, a floppy disk, flash memory, an optical data storage, and a carrier wave (such as data transmission through the Internet). In addition, the computer-readable recording medium can be distributed over a plurality of computer systems which are connected to one another in a network so that computer-readable codes are stored on the computer-readable recording medium in a decentralized manner.

As described above, according to exemplary embodiments of the present invention, a preference value is dynamically provided to each home agent on a home link, and a mobile node issues a binding update request to a home agent with a smallest load by referring to the preference value of each home agent. Therefore, it is possible to construct an efficient IPv6 network by taking various network states into account and appropriately distributing loads among home agents.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A multi-home agent control apparatus, which manages a plurality of home agents, the multi-home agent control apparatus comprising:
   a packet observing unit, which observes a packet input to or output from a home link;
   a home agent list storage unit, which creates a home agent list using home address information included in a binding update (BU) message and stores the home agent list if the packet observing unit receives the BU message and a binding acknowledgement (BACK) message; and
   a preference value calculation unit, which calculates a preference value of each of the home agents using the home agent list.

2. The multi-home agent control apparatus of claim 1, wherein the packet observing unit comprises:
   an inbound packet observing unit, which reads a packet transmitted to the home link from an external link, and transfers home address information included in the packet to a temporary memory if the packet is a BU message; and
   an outbound packet observing unit, which reads a packet transmitted to an external link from the home link, and copies the home address information stored in the temporary memory to a main memory if the packet is a BACK message that contains information indicating that binding has been accepted.

3. The multi-home agent control apparatus of claim 1, wherein the preference value calculation unit calculates the preference value of each of the home agents by calculating the number of mobile nodes bound to each of the home agents.

4. The multi-home agent control apparatus of claim 1, wherein the preference value calculation unit calculates the preference value of each of the home agents by respectively multiplying a performance weight of each of the home agents by the number of mobile nodes bound to each of the home agents.

5. The multi-home agent control apparatus of claim 1, wherein the home address information comprises a first home address, which is recorded in a home address option field of a received packet, a second home address, which is a destination address of an IPv6 header included in the received packet, a care-of-address (CoA), and lifetime information.

6. The multi-home agent control apparatus of claim 1, wherein the home agent list storage unit comprises a temporary memory and a main memory, and wherein the home list information stored in the temporary memory is deleted if a BACK message has not been received for more than a predetermined amount of time, and the home list information stored in the temporary memory is copied to the main memory if a BACK message has been received.

7. A multi-home agent control method, which is used to manage a plurality of home agents, the multi-home agent control method comprising:
   (a) observing a packet input to or output from a home link;
   (b) creating a home agent list using home address information included in a binding update (BU) message and storing the home agent list if the BU message and a binding acknowledgement (BACK) message are received in (a); and
   (c) calculating a preference value of each of the home agents using the home agent list.

8. The multi-home agent control method of claim 7, wherein in (c), the preference value of each of the home agents is calculated by counting the number of mobile nodes bound to each of the home agents.

9. The multi-home agent control method of claim 6, wherein in (c), the preference value of each of the home agents is calculated by respectively multiplying a performance weight of each of the home agents by the number of mobile nodes bound to each of the home agents.

10. The multi-home agent control method of claim 7, wherein the home address information comprises a first home address, which is recorded in a home address option field of a received packet, a second home address, which is a destination address of an IPv6 header included in the received packet, a care-of-address (CoA), and lifetime information.

11. A multi-home agent control method, which is used to manage a plurality of home agents, the multi-home agent control method comprising:
   (a) reading a packet transmitted to a home link from an external link;
   (b) storing home address information, which includes a home address recorded in a home address option field of the packet read in (a), a destination address of an IPv6 header of the packet, a care-of-address (CoA) and lifetime information, in temporary memory if the packet is a BU message;
   (d) reading a packet transmitted to an external link from the home link and determining whether the packet is a binding acknowledgement (BACK) message;
   (e) creating a home agent list if the packet read in (d) is a BACK message;
   (f) calculating a preference value of each of the home agents using the home agent list; and (g) updating the home agent list at a predetermined frequency.

12. The multi-home agent control method of claim 11, wherein (b) comprises:
   (b1) determining whether a mobility header is contained in a next header field of the IPv6 packet of the packet read in (a) and whether the mobility header indicates that the packet is a BU message; and
   (b2) determining whether a home registration field of the BU message is set to 1 and whether the home registration field includes a home address option.

13. The multi-home agent control method of claim 11, wherein in (d), the packet is determined to be a BACK message if a status field of the packet has a value of 0.

14. The multi-home agent control method of claim 11, wherein in (f), the preference value of each of the home agents is calculated by calculating the number of mobile nodes bound to each of the home agents.

15. The multi-home agent control method of claim 11, wherein in (f), the preference value of each home agent is calculated by respectively multiplying performance weight of each of the home agents by the number of mobile nodes bound to each of the home agents.

16. The multi-home agent control method of claim 11, wherein the home address information comprises a first home address, which is recorded in a home address option field of a received packet, a second home address, which is a destination address of an IPv6 header included in the received packet, a care-of-address (CoA), and lifetime information.

17. A computer-readable recording medium storing a program for implementing a method of managing a plurality of home agents, the method comprising:
   (a) observing a packet input to or output from a home link;
   (b) creating a home agent list using home address information included in a binding update (BU) message and storing the home agent list if the BU message and a binding acknowledgement (BACK) message are received in (a); and
   (c) calculating a preference value of each of the home agents using the home agent list.

18. The multi-home agent control apparatus of claim 1, wherein the home agent list comprises address information and the preference value of each of the home agents which transmits the BACK message.

19. The multi-home agent control apparatus of claim 18, wherein each of the home agents has the home agent list.

20. The multi-home agent control apparatus of claim 18, wherein the address information of each of the home agents is associated with address information and a care-of-address of each of a plurality of mobile nodes, respectively, in the home agent list.

21. The multi-home agent control method of claim 7, wherein the home agent list comprises address information and the preference value of each of the home agents which transmits the BACK message.

22. The multi-home agent control method of claim 21, wherein each of the home agents has the home agent list.

23. The multi-borne agent control method of claim 21, wherein the address information of each of the home agents is associated with address information and a care-of-address of each of a plurality of mobile nodes, respectively, in the home agent list.

24. The multi-home agent control apparatus of claim 1,
   wherein the home address information comprises a home address recorded in a home address option field of a packet input to the home link, a destination address of an IPv6 header of the packet, a care-of-address and lifetime information, and the home address information is stored in the home agent list storage unit if the packet is a binding update message;
   wherein the home agent list is created and stored in the home agent list storage unit if a packet output from the home agent to an external link is a binding acknowledgment message; and
   wherein the home agent list is updated at a predetermined frequency.

* * * * *